United States Patent
Tian et al.

(10) Patent No.: US 9,507,224 B2
(45) Date of Patent: Nov. 29, 2016

(54) DISPLAY PANEL

(71) Applicant: BOE TECHNOLOGY GROUP CO., LTD., Beijing (CN)

(72) Inventors: Yunyun Tian, Beijing (CN); Hyun Sic Choi, Beijing (CN); Qiangtao Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 14/406,656

(22) PCT Filed: Jun. 20, 2014

(86) PCT No.: PCT/CN2014/080425
§ 371 (c)(1),
(2) Date: Dec. 9, 2014

(87) PCT Pub. No.: WO2015/078176
PCT Pub. Date: Jun. 4, 2015

(65) Prior Publication Data
US 2015/0355512 A1 Dec. 10, 2015

(30) Foreign Application Priority Data
Nov. 29, 2013 (CN) .......................... 2013 1 0631691

(51) Int. Cl.
*G02F 1/1343* (2006.01)
*G02F 1/1335* (2006.01)
(Continued)

(52) U.S. Cl.
CPC ... *G02F 1/134363* (2013.01); *G02F 1/133514* (2013.01); *G02F 1/134309* (2013.01); *G02F 2001/134318* (2013.01); *G02F 2001/134381* (2013.01)

(58) Field of Classification Search
CPC ............. G02F 2001/134381; G02F 1/136218; G02F 1/134363; G02F 2001/134372; G02F 2001/134318; G02F 1/136209; G02F 1/133512; G02F 1/133514
USPC ................................. 349/106, 110, 129, 141
See application file for complete search history.

(56) References Cited

U.S. PATENT DOCUMENTS 6,081,309 A 6/2000 Suzuki et al.
6,900,869 B1 5/2005 Lee et al.
(Continued)

FOREIGN PATENT DOCUMENTS

| CN | 1530724 A | 9/2004 |
| CN | 103676352 A | 3/2014 |
| KR | 2003-0097513 A | 12/2003 |

OTHER PUBLICATIONS

International Search Report, International Preliminary Report on Patentability and Written Opinion of the International Searching Authority of PCT/CN2014/080425 in Chinese, mailed Jun. 20, 2014.
(Continued)

*Primary Examiner* — Nathanael R Briggs
(74) *Attorney, Agent, or Firm* — Collard & Roe, P.C.

(57) ABSTRACT

A display panel (01) is provided. The display panel (01) includes a first substrate (10) and a second substrate (20) bonded to each other, and electro-optic material (30) disposed between the first substrate (10) and the second substrate (20). The first substrate (10) includes a thin film transistor (101), a first electrode (102) and a second electrode (103). The second substrate (20) may comprise a resin layer and a plurality of conductive electrodes (202), the resin layer includes a plurality of color filters having different colors and arranged sequentially and alternately. Along a color changing direction of the color filters of the resin layer, at least a part (202a) of one conductive electrode (202) is disposed at an edge of at least one color filter. The conductive electrode (202) may be disposed above or under the resin layer. The conductive electrode (202) may be of the same potential with any one of the first electrode (102) and the second electrode (103).

20 Claims, 6 Drawing Sheets

(51) Int. Cl.
*G02F 1/1333* (2006.01)
*G02F 1/1337* (2006.01)

(56) References Cited

U.S. PATENT DOCUMENTS

| | | |
|---|---|---|
| 7,542,112 B2 | 6/2009 | Rhee et al. |
| 2003/0128325 A1 | 7/2003 | Yun et al. |
| 2004/0257513 A1* | 12/2004 | Chin ............... G02F 1/134336 349/142 |
| 2007/0052899 A1* | 3/2007 | Lin ................... G02F 1/134363 349/141 |
| 2013/0314635 A1* | 11/2013 | Takeda ............. G02F 1/136286 349/43 |

OTHER PUBLICATIONS

First Chinese Office Action of Chinese Application No. 201310631691.0, mailed Oct. 10, 2014 with English translation.
Second Chinese Office Action of Chinese Application No. 201310631691.0, mailed Mar. 13, 2015 with English translation.
English translation of the International Preliminary Report on Patentability and Written Opinion of the International Searching Authority of PCT/CN2014/080425, issued May 31, 2016.

* cited by examiner

DISPLAY PANEL

CROSS REFERENCE TO RELATED APPLICATIONS

This application is the National Stage of PCT/CN2014/080425 filed on Jun. 20, 2014, which claims priority under 35 U.S.C. §119 of Chinese Application No. 201310631691.0 filed on Nov. 29, 2013, the disclosure of which is incorporated by reference.

TECHNICAL FIELD

Embodiments of the present invention relate to a field of display technology, and in particular, to a display panel.

BACKGROUND

Currently, liquid crystal display (LCD) has become a main-stream display device in the display field, and its core component is a liquid crystal display panel. The display principle of the liquid crystal display panel is as follows: when no voltage is applied between two field generating electrodes of the liquid crystal display panel, long axis direction of liquid crystal molecules may be parallel to a substrate-plane direction of an array substrate and a color filter substrate of the liquid crystal display panel; when a voltage is applied to the liquid crystal molecules, the liquid crystal molecules rotate, that is, the long axis direction of liquid crystal molecules and the substrate-plane direction have a certain oblique angle; when the voltage is enough high, the liquid crystal molecules may rotate to a direction normal to the substrate plane; such property of the liquid crystal molecules which can generate rotation of different angles under the driving of voltages, so that liquid crystal molecules can change transmittance of light emitted by a back light source, so as to achieve the aim of displaying.

With continuous development of liquid crystal display, in order to further meet requirements by the market on the liquid crystal display having a large dimension and a high resolution, researchers have developed wide viewing angle technology. A multi-dimensional electrical field may be formed by an electrical field generated by edges of slit electrodes in the same plane and an electrical field generated between a slit electrode layer and a plate-shape electrode layer, and this multi-dimensional electrical field makes all the liquid crystal molecules between the slit electrodes and above the slit electrodes in the liquid crystal layer rotate, so as to improve operating efficiency of liquid crystal and improve light transmittance.

However, with continual improvement of resolution of the liquid crystal display panel, an area of a pixel electrode corresponding to color filters of each color becomes smaller, and when an electrical field is applied, a fringe field effect between two adjacent color filters having two different colors becomes non-ignorable, so as to cause a color-mixing phenomenon between color filters of different colors, and influence the display effect of the liquid crystal display panel.

SUMMARY

At least one embodiment of the present invention provides a display panel, which may reduce a color-mixing phenomenon between two adjacent color filters, and improve display effect of the display panel.

At least one embodiment of the present invention provides a display panel, which may comprise a first substrate and a second substrate bonded to each other, and electro-optic material disposed between the first substrate and the second substrate, wherein the first substrate may comprise a thin film transistor, a first electrode and a second electrode, the second substrate may comprise a resin layer and a plurality of conductive electrodes, the resin layer may comprise a plurality of color filters having different colors and arranged sequentially and alternately, wherein along a color changing direction of the color filters of the resin layer, at least a part of one conductive electrode may be disposed at an edge of at least one color filter, and the conductive electrode may be disposed above or under the resin layer, and the conductive electrode may be of the same potential with any one of the first electrode and the second electrode.

In one embodiment, an edge of each color filter is provided with one conductive electrode.

In one embodiment, along a color changing direction of the color filters of the resin layer, with respect to any two adjacent color filters, one conductive electrode may be disposed at a position where the any two adjacent color filters oppose to each other; wherein at the edge of any one color filter, a part of the one conductive electrode is provided.

In one embodiment, any two adjacent color filters may be symmetric relative to a center line of a corresponding one of the conductive electrodes.

In one embodiment, along a color changing direction of the color filters of the resin layer, the plurality of conductive electrodes have an equal width.

In one embodiment, the plurality of conductive electrodes may be all disposed at a side of the resin layer closer to the electro optic material.

In one embodiment, the plurality of conductive electrodes may be all electrically connected to one another.

In one embodiment, along a thickness direction of the display panel, a projection of the conductive electrode and a projection of the first electrode or the second electrode which is at a different potential from the conductive electrode, may do not overlap.

In one embodiment, the first electrode and the second electrode may be disposed at the same layer; or alternatively, the first electrode and the second electrode may be disposed at different layers, and the conductive electrodes may be of the same potential with one electrode of the first and second electrodes which is away from the conductive electrode.

In one embodiment, the conductive electrodes may be of the same potential with the second electrode, and in the case that the first and second electrodes are disposed at different layers, the first electrode may be a strip-shape electrode, and the second electrode may be a plate-shape electrode; or alternatively, the conductive electrodes may be of the same potential with the first electrode, and in the case that the first and second electrodes are disposed at different layers, the second electrode may be a strip-shape electrode, and the first electrode may be a plate-shape electrode.

In at least one embodiment of the present invention, by disposing a plurality of conductive electrodes on the second substrate, a vertical electrode field may be generated between the conductive electrode corresponding to the edge of any one color filter and the first electrode or the second electrode on the first substrate under the color filter, and the vertical electrode field may reduce an influence of a horizontal component of the electrical field generated by the first and second electrodes on the rotation of the electrical optical material corresponding to the edges of two adjacent color filters close to each other, so as to reduce a color-mixing phenomenon between two adjacent color filters, and improve a display effect of the display panel.

BRIEF DESCRIPTION OF THE DRAWINGS

To describe technical solutions in the embodiments of the present invention or in the prior art clearer, the following will give a brief explanation on the figures required and used in the descriptions of the embodiments or the prior art. Obviously, the figures in the following description are merely some embodiments of the present invention. Those skilled in the art may further obtain other figures according to these figures, without paying creative labor.

DETAILED DESCRIPTION

Technical solutions in the embodiments of the present invention will be described clearly and completely below in connection with the figures in the embodiments of the present invention. Obviously, the described embodiments are only a portion of the embodiments of the present invention, not all the embodiments. Based on the embodiments in the present invention, all other embodiments, which can be obtained by those skilled in the art without giving creative labor, belong to the scope protected by the present invention.

Figure 1:
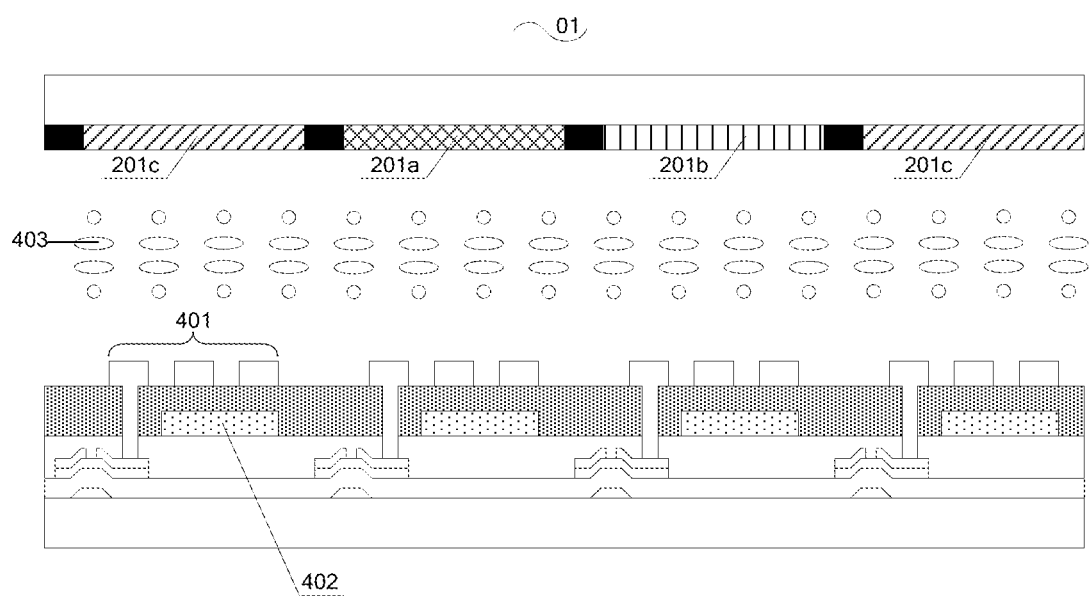
FIG. 1 is a cross-sectional structural diagram of a liquid crystal display panel.
Figure 2:
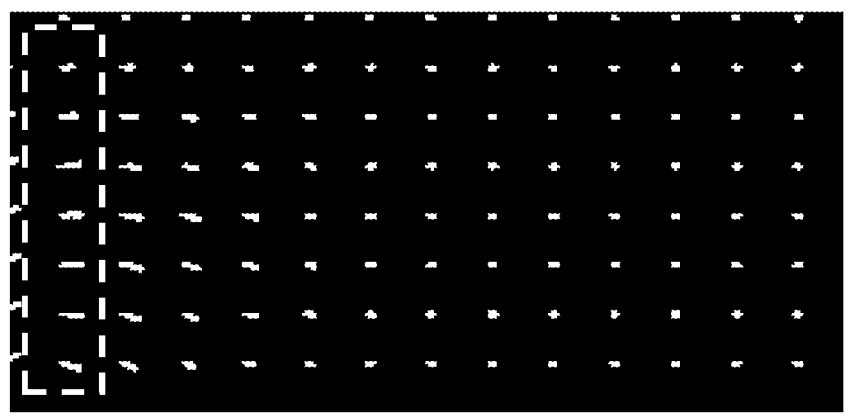
FIG. 2 is a simulation effect diagram of liquid crystal molecules corresponding to an edge of two adjacent color filters being influenced by a fringe field effect.

For example, as illustrated in FIG. 1, in one display unit of a liquid crystal display panel 01, when it only requires that the red color filter 201a displays red, a voltage is applied to a pixel electrode 401 and a common electrode 402, and liquid crystal molecules 403 corresponding to the red color filter 201a rotate under a function of an electrical field, so that light of an back light source passes through the red color filter 201a and displays red color; however, at edges of a green color filter 201b and a blue color filter 201c adjacent to the red color filter 201a, closer to the red color filter 201a, it would be influenced by an horizontal component of the electrical field to cause liquid crystal molecules at these places to rotate too. That is, the liquid crystal molecules of the dash line portion illustrated in FIG. 2 would rotate in a horizontal direction, and it appears macroscopically that the side of the green color filter 201b and the blue color filter 201c closer to the red color filter 201a will also emit light, causing that a portion of green light and blue light is doped into a pixel unit which should only display a red color, so that it causes a mixing color phenomenon generated between the color filters having adjacent colors.

An embodiment of the present invention provides a display panel 01. As illustrated in FIGS. 3-10, the display panel 01 may comprise: a first substrate 10 and a second substrate 20 bonded to each other, and electro-optic material 30 disposed between the first substrate 10 and the second substrate 20. The first substrate 10 may comprise a thin film transistor 101, a first electrode 102 and a second electrode 103. The second substrate 20 may comprise: a resin layer, comprising a plurality of color filters having different colors and arranged sequentially and alternately; and a plurality of conductive electrodes 202.

Along a color changing direction of the color filters of the resin layer, at least a part 202a of one conductive electrode 202 may be disposed at an edge of at least one color filter, and the conductive electrode 202 may be disposed above or under the resin layer, and the conductive electrode 202 may be of the same potential with any one of the first electrode 102 and the second electrode 103.

It should be noted here:

First, the electrical optical material 30 can generate rotation of different angles under the function of the electrical field formed between the first electrode 102 and the second electrode 103, so that the electrical optical material 30 can change the transmittance of the light passing through the display panel, so as to achieve the aim of displaying. Here, the electrical optical material 30 may be, for example, liquid crystal material in the liquid crystal display panel. In order to make the first electrode 102 have a certain potential, the first electrode 102 may be electrically connected with a drain electrode of a thin film transistor 101, at the same time, by applying a voltage to the second electrode 103, there may exist a certain voltage difference between the first electrode 102 and the second electrode 103.

Second, the embodiments do not make restriction on the number of the conductive electrodes 202, as long as it can guarantee that there exists the conductive electrode 202 above or under the edge at two sides of any one color filter of the resin layer, along the color changing direction of the color filters of the resin layer. Here, the conductive electrode 202 located above or under the edge at two sides of any one color filter may be one integral conductive electrode 202, and may also be a portion of one integral conductive electrode 202, i.e. a part 202a of the electrode.

Here, along the color changing direction of the color filters of the resin layer may also be understood as along a direction of a gate line which is electrically connected with a gate of the thin film transistor 101.

In addition, the conductive electrodes 202 may have a certain transmittance as desired, and it is not limited here.

Third, with respect to any one of the conductive electrodes 202, it may be disposed above the resin layer, and may also be disposed under the resin layer, that is, along the color changing direction of the color filters of the resin layer, any one of the color filters comprise two edges, wherein one conductive electrode 202 or a portion of the conductive electrode 202 corresponding to one edge may be disposed above the color filter, and one conductive electrode 202 or a portion of the conductive electrode 202 corresponding to the other edge may be disposed under the color filter.

Here, if the edges of two adjacent color filters commonly correspond to one conductive electrode 202, the one conductive electrode 202 may simultaneously be disposed above the two color filters or under the two color filters.

Fourth, the edge of any one of the color filters described above is referred to with respect to a central region of the color filter. Here, in order to prevent the conductive electrode 202 from reducing the transmittance of the color filter and interfering with a normal operation of the display panel 01, the conductive electrode 202 should be disposed at a position above or under the edge away from the center of the color filter as far as possible.

Fifth, the conductive electrode 202 being of the same potential as the first electrode 102 or the second electrode 103 is to generate a vertical electrical field between the conductive electrode 202 and the other electrode having a different potential, in the case of meeting the requirement of not interfering with the normal display of the display panel 01, so as to reduce the rotation of the electrical optical material at the edges of the other two color filters adjacent to one color filter in a horizontal direction when the one color filter emits light.

With respect to the case that the first electrode 102 and the second electrode 103 are disposed at the same layer on the first substrate 10, the conductive electrode 202 may be of the same potential as any one electrode of the first electrode 102 and the second electrode 103; with respect to the case that the first electrode 102 and the second electrode 103 are disposed at different layers on the first substrate 10, the conductive electrode 202 may be of the same potential as one electrode of the first electrode 102 and the second electrode 103 away from the conductive electrode 202, and may form a vertical electrical field with the other electrode closer to the conductive electrode 202.

Sixth, those skilled in the art will understand that FIGS. 3 to 10 give an explanation by taken the first substrate 10 comprising a bottom gate type thin film transistor as an example, however, the embodiments of the present invention is not limited thereto. In addition, FIGS. 3 to 10 only schematically provide a case that the resin layer comprises color filters have three colors and arranged sequentially and alternately, that is, comprises a plurality of red color filters 201a, green color filters 201b and blue color filters 201c arranged sequentially and alternately, however, the present invention is not limited thereto, and the color filters may further comprise color filters having other colors such as a white color filter and so on.

An embodiment of the present invention provides a display panel 01. The display panel 01 may comprise: a first substrate 10 and a second substrate 20 bonded to each other, and electro-optic material 30 disposed between the first substrate 10 and the second substrate 20. The first substrate 10 may comprise a thin film transistor 101, a first electrode 102 and a second electrode 103. The second substrate 20 may comprise: a resin layer, comprising a plurality of color filters having different colors and arranged sequentially and alternately; and a plurality of conductive electrodes 202. Along a color changing direction of the color filters of the resin layer, at least a part 202a of one conductive electrode 202 may be disposed at an edge of at least one color filter, and the conductive electrode 202 may be disposed above or under the resin layer. The conductive electrode 202 may be of the same potential with any one of the first electrode 102 and the second electrode 103.

By disposing a plurality of conductive electrodes 202 on the second substrate 20, a vertical electrode field may be generated between the conductive electrode 202 corresponding to the edge of any one color filter and the first electrode 102 or the second electrode 103 on the first substrate 10 under the color filter, and the vertical component may reduce the influence of the horizontal component of the electrical field generated by the first electrode 102 and the second electrode 103 on the rotation of the electrical optical material 30 corresponding to the edge of two adjacent color filters close to each other.

Figure 11:
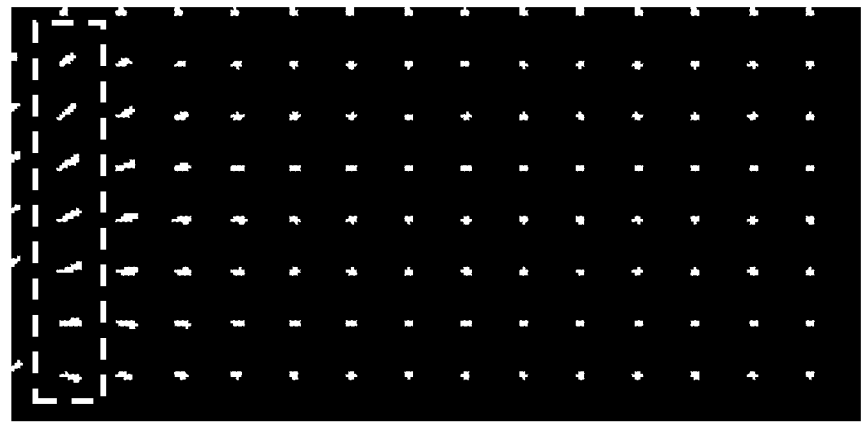
FIG. 11 is a simulation effect diagram of reducing an influence of the fringe field on the electrical optical material corresponding to the edges of two adjacent color filters according to the embodiment of the present invention.

Here, the effect of the vertical electrical field generated between the conductive electrode 202 and the first electrode 102 or the second electrode 103 reducing the mixing color phenomenon between any two adjacent color filters may refer to the following simulation diagrams:

As illustrated in FIG. 11, the dash line portion indicates molecules of the electrical optical material 20 corresponding to the edge of one color filter are influenced by the above described vertical electrical field, and the function of the horizontal component of the multi dimensional electrical field formed between the first electrode 102 and the second electrode 103 on the rotation of the molecules of the electrical optical material 30 is reduced by the vertical electrical field. It appears that the rotation of molecules of the electrical optical material 30 in the vertical direction is more apparent, and it appears particularly in reducing the light emission of the color filter corresponding to this portion of the electrical optical material 30.

Figure 12:
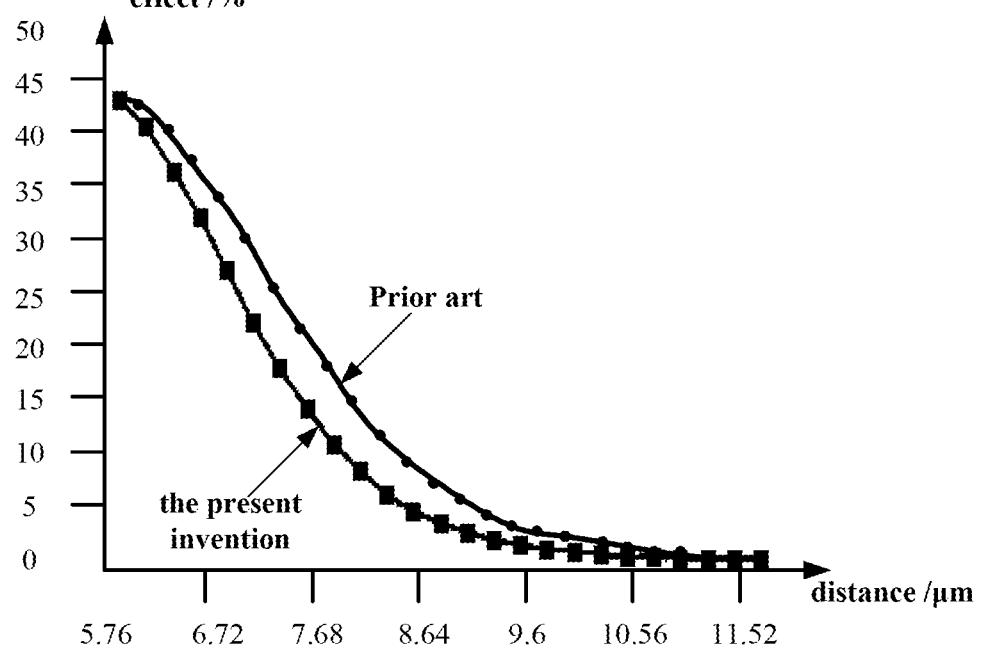
FIG. 12 is a simulation data diagram of reducing an influence of the fringe field on the electrical optical material corresponding to the edges of two adjacent color filters according to the embodiment of the present invention.

On the basis of this, as illustrated in FIG. 12, the fringe field effect between two adjacent color filters in the display panel 01 provided by the embodiment of the present invention is smaller than the fringe field effect between two adjacent color filters in the display panel as illustrated in FIG. 1, for example, so that it reduces or prevents mixing light of color filters having other colors adjacent thereto when macroscopically displaying color filter of one certain color.

Figure 9:
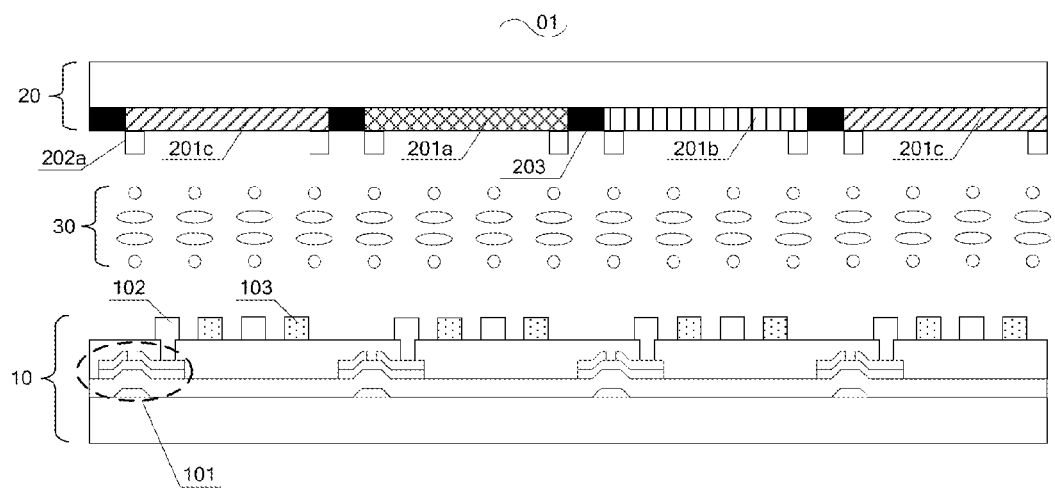
FIG. 9 is a cross-sectional structural diagram of a display panel provided by an embodiment of the present invention.
Figure 10:
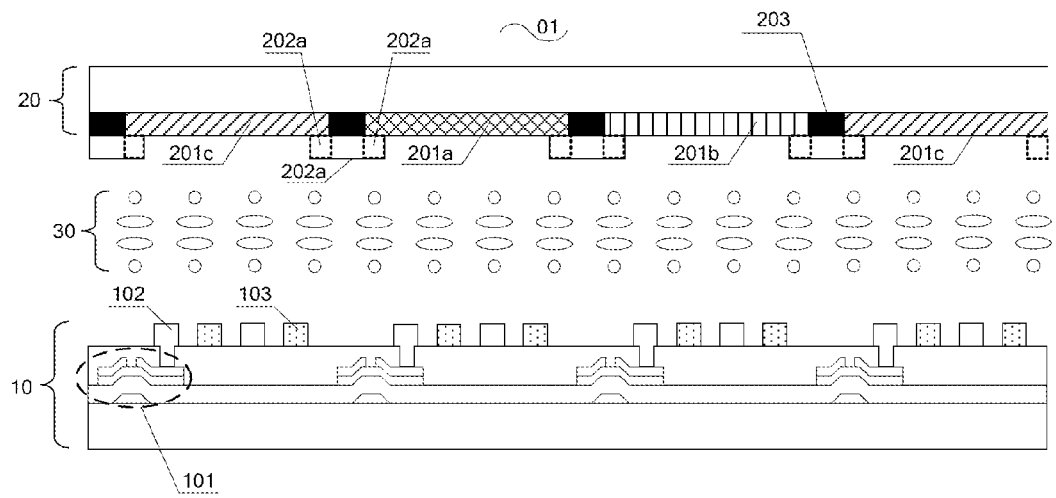
FIG. 10 is a cross-sectional structural diagram of a display panel provided by an embodiment of the present invention.

Based on the above description, in the display panel 01, it does not make restriction on the relative position of the first electrode 102 and the second electrode 103 in the first substrate 10, that is, the first electrode 102 and the second electrode 103 may be disposed at the same layer, and may also be disposed at different layers. As illustrated in FIG. 9 and FIG. 10, in the case that the first electrode 102 and the second electrode 103 are disposed at the same layer, since the two electrodes are disposed at the same layer, the electrical field formed between the first electrode 102 and the second electrode 103 has a relatively small rotation controlling function on the electrical optical material 30, so that the aperture ratio of the display panel 01 is relatively small; however, compared with the case that the first electrode 102 and the second electrode 103 are disposed at the same layer, as illustrated in FIGS. 3-8, in the case that the first electrode 102 and the second electrode 103 are disposed at different layers, the electrical field formed between the first electrode 102 and the second electrode 103 has a relatively large rotation controlling function on the electrical optical material 30, so that the aperture ratio of the display panel 01 is relatively higher. Thus, it is preferable in the embodiment of the present invention that, in the first substrate 10, the first electrode 102 and the second electrode 103 may be disposed in different layers.

On the basis of this, in particular, the display panel 01 provided by the embodiment of the present invention may comprise the following two alternative structures:

With respect to the case that the conductive electrode 202 is of the same potential with the second electrode 103, as illustrated in FIGS. 3 to 6, the first electrode 102 may be disposed at a side close to the electrical optical material 30, and the first electrode 102 is a strip-shape electrode, and the second electrode 103 may be disposed at a side away from the electrical optical material 30, and the second electrode 103 is a plate-shape electrode.

Figure 7:
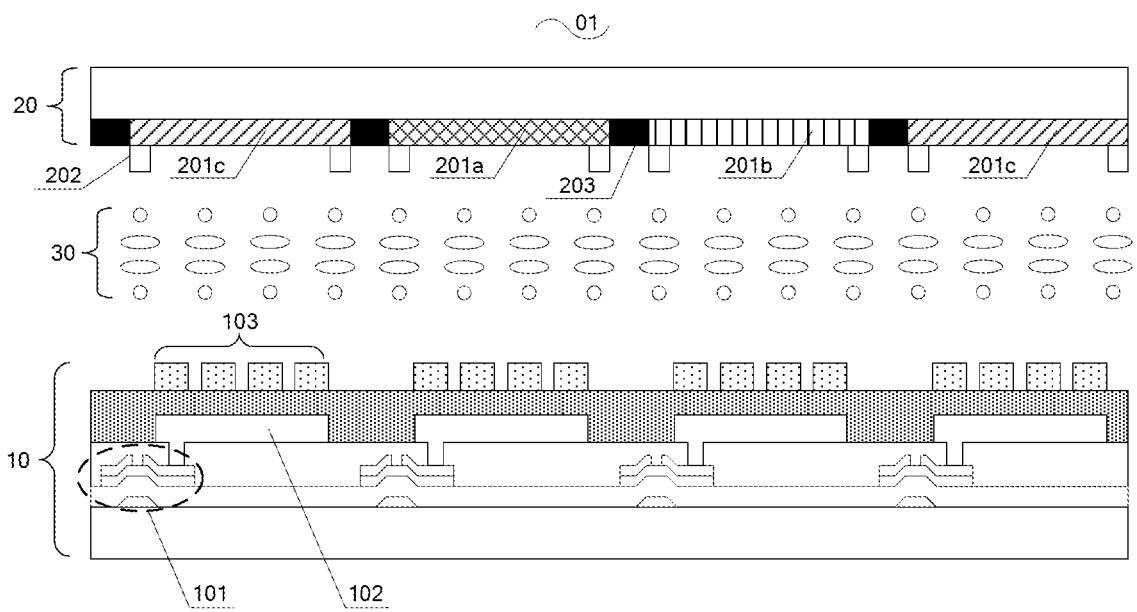
FIG. 7 is a cross-sectional structural diagram of a display panel provided by an embodiment of the present invention.
Figure 8:
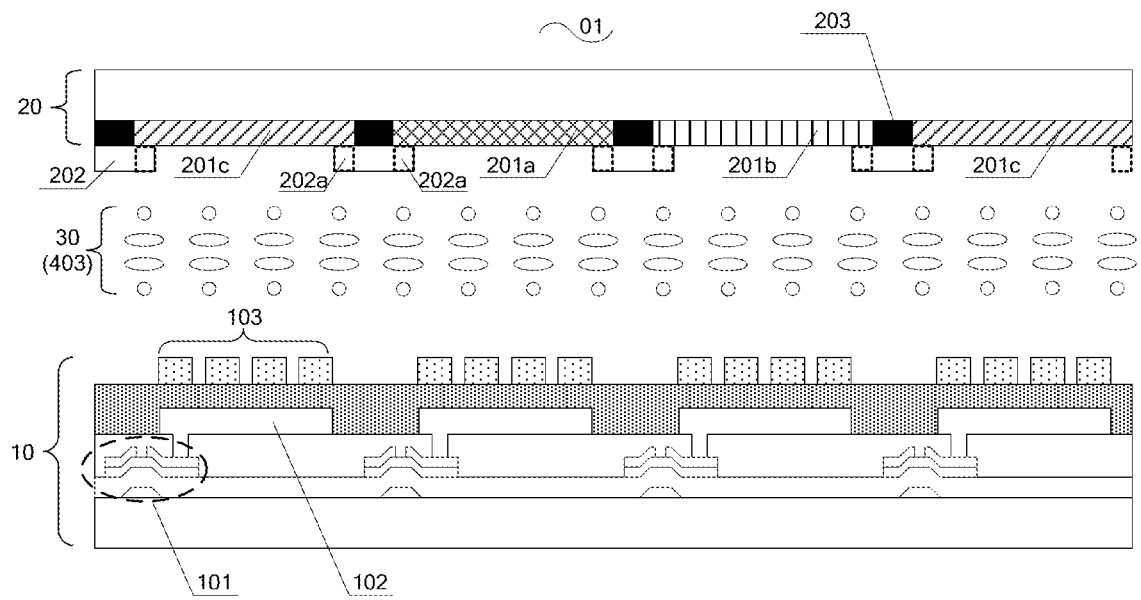
FIG. 8 is a cross-sectional structural diagram of a display panel provided by an embodiment of the present invention.

With respect to the case that the conductive electrode 202 is of the same potential with the first electrode 102, as illustrated in FIGS. 7 and 8, the second electrode 103 may be disposed at a side close to the electrical optical material 30, and the second electrode 103 is a strip-shape electrode, and the first electrode 102 may be disposed at a side away from the electrical optical material 30, and the first electrode 102 is a plate-shape electrode.

With respect to any one conductive electrode 202, it may be disposed above the resin layer, and may also be disposed under the resin layer. However, considering that when the conductive electrode 202 is disposed at a side close to the electrical optical material 30, the field intensity of the vertical electrical field formed between the conductive electrode 202 and the first electrode 102 or the second electrode 103 is stronger, which may better reduce the influence of the horizontal component of the electrical field generated between the first electrode 102 and the second electrode 103 on the rotation of the electrical optical material 30 corresponding to the conductive electrode 202. Thus, preferably, a plurality of conductive electrodes 202 may be all disposed at a side of the resin layer close to the electrical optical material 30.

Considering that the conductive electrode 202 needs to be of the same potential as the second electrode 103 or the first electrode 102, the plurality of conductive electrodes 202 may be electrically connected with each other.

In addition, in order to make the field intensity of the vertical electrical fields formed between the conductive electrodes 202 and the first electrode 102 or the second electrode 103 in the display panel 01, and maximally simplify the manufacturing process of the conductive electrodes 202, in the embodiment of the present invention, along the color changing direction of the color filters of the resin layer, the plurality of conductive electrodes 202 may have an equal width.

Since the first electrode 102 and/or the second electrode 103 correspond to the region of the display panel 01 which can effectively display image, the first electrode 102 and the second electrode 103 both use transparent conductive electrode material. In addition, in order to further increase the aperture ratio of the display panel 01, it is preferable in the embodiment of the present invention that the conductive electrode 202 may also use transparent conductive electrode material. Here, considering the convenience of the manufacturing process of the conductive electrode 202, the material of the conductive electrode 202 may use the same transparent conductive material as that of the first electrode 102 and/or the second electrode 103, for example, it may use indium tin oxide (ITO) or indium zinc oxide (IZO) or other transparent conductive materials.

On the basis of the above, the conductive electrode 202 may use the following two arranging manners, which are described in particularly as below:

One manner is: referring to FIGS. 3, 5, 7 and 9, one conductive electrode 202 is disposed at the edge of any one color filter, respectively. Here, the conductive electrode 202 is one integral electrode.

The second manner: referring to FIGS. 4, 6, 8 and 10, along the color changing direction of the color filters of the resin layer, with respect any two adjacent color filters, one conductive electrode 202 is provided at the location where the two adjacent color filters oppose to each other. As for any one of the two adjacent color filters, a part 202a of the one conductive electrode 202 is disposed at its edge.

With respect to the second manner, in order to make the field intensity of the vertical electrical fields formed between the conductive electrode 202 and the first electrode 102 or the second electrode 103 in the display panel 01, preferably, any two adjacent color filters may be symmetric with respect to a center line of one corresponding conductive electrode 202, that is, the widths of two parts 202a of the electrode corresponding to any two adjacent color filters respectively are identical.

Based on the above description, preferably, along the thickness direction of the display panel 01, the projection of the conductive electrode 202 and the projection of the first electrode 102 or the second electrode 103, which has a different potential from the conductive electrode 202, may do not overlap.

Here, in order to avoid influence on the entire electrical field of the electrical optical material 30 of the display panel 01 when a vertical electrical field is generated between the conductive electrode 202 and the first electrode 102 or the second electrode 103, along the thickness direction of the display panel 01, the projection of the conductive electrode 202 and the projection of the first electrode 102 or the second electrode 103, which has a different potential from the conductive electrode 202, do not overlap. That is, referring to FIGS. 3 to 10, along the thickness direction of the display panel 01, with respect to any one said color filter, the conductive electrode 202 may be located above the outside of the first electrode 102 or the second electrode 103 corresponding to the conductive electrode 202.

The following provides two detailed embodiments, to explain the above display panel 01 in detail.

Detailed First Embodiment

Figure 3:
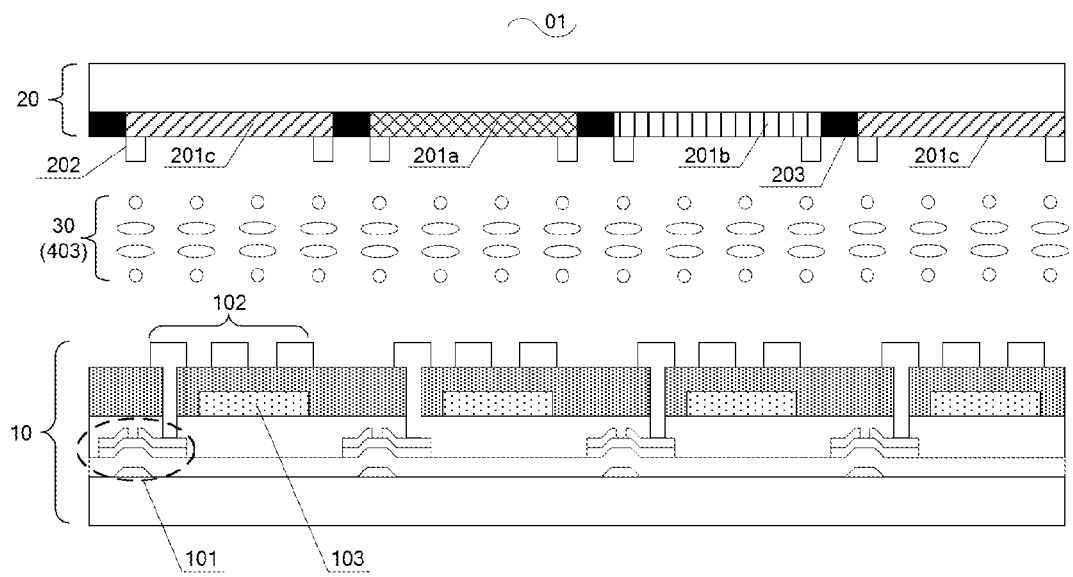
FIG. 3 is a cross-sectional structural diagram of a display panel provided by an embodiment of the present invention.
Figure 4:
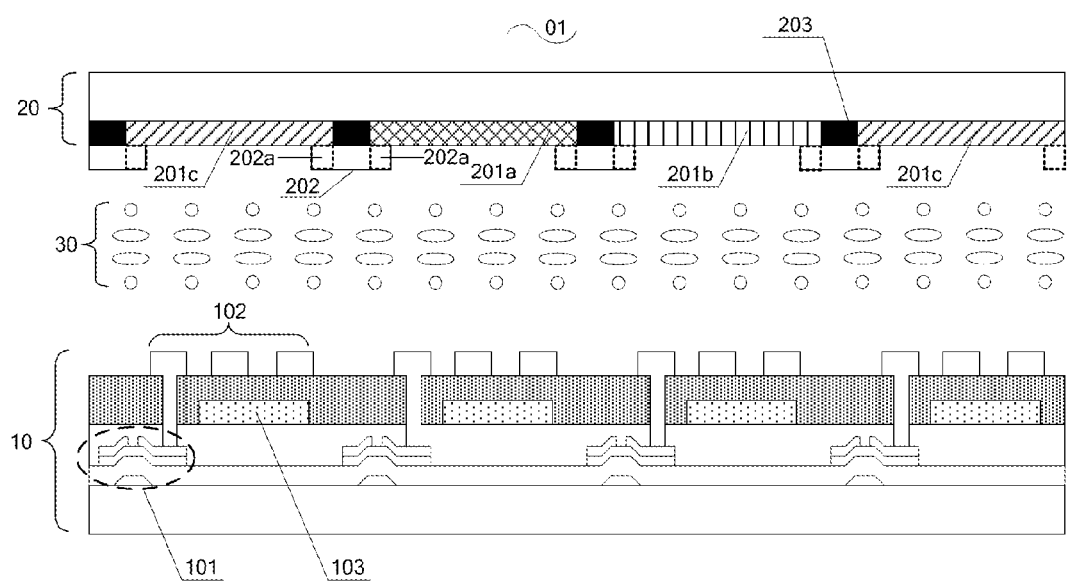
FIG. 4 is a cross-sectional structural diagram of a display panel provided by an embodiment of the present invention.
Figure 5:
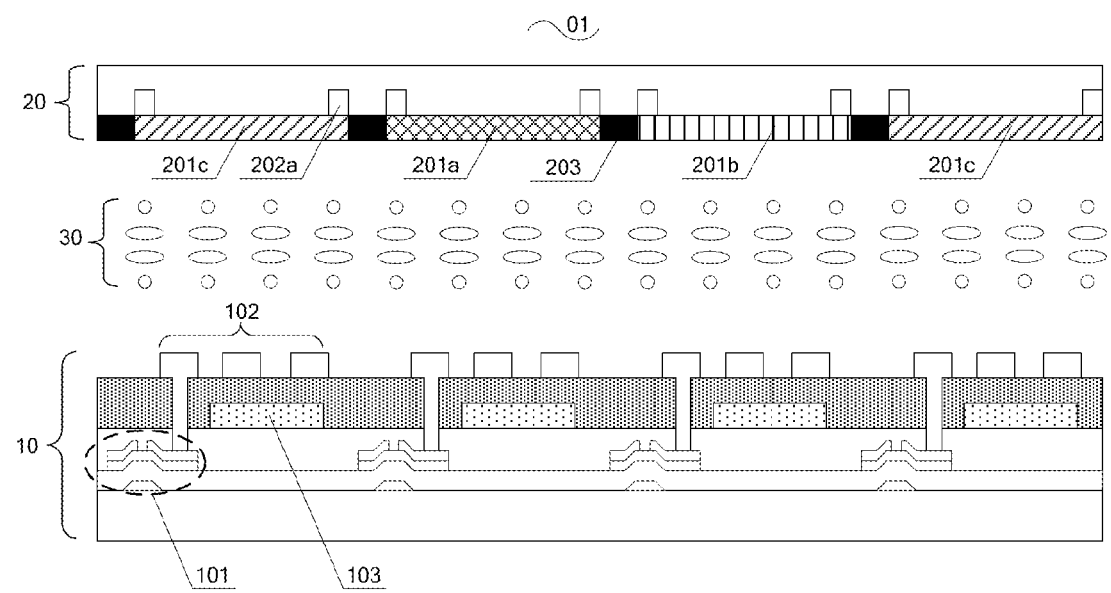
FIG. 5 is a cross-sectional structural diagram of a display panel provided by an embodiment of the present invention.
Figure 6:
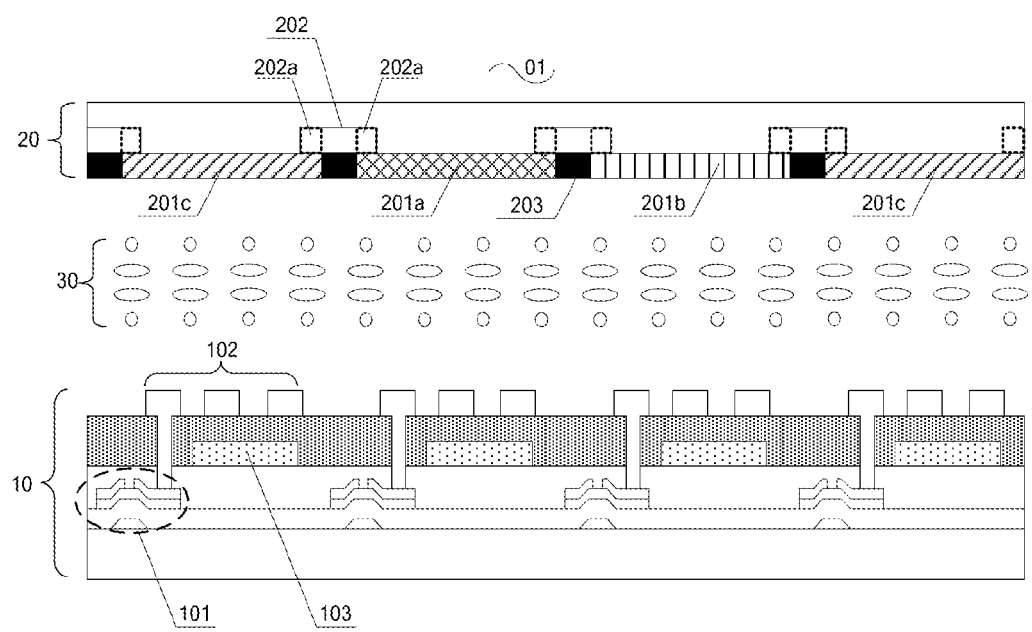
FIG. 6 is a cross-sectional structural diagram of a display panel provided by an embodiment of the present invention.

The first embodiment of the present invention provides a liquid crystal display panel 01, and referring to FIG. 3, the liquid crystal display panel 01 may comprise a first substrate 10 and a second substrate 20 bonded to each other, and liquid crystal molecules 403 disposed between the first electrode 10 and the second substrate 20. The first substrate 10 may comprise a bottom-gate type thin film transistor 101, a plate-shape second electrode 103, and a stripe-shape first electrode 102 disposed above the second electrode 103 and electrically connected with the drain electrode of the thin film transistor 101. The second substrate 20 may comprise a resin layer, and the resin layer may comprise a plurality of red color filters 201a, green color filters 201b and green color filters 201c arranged sequentially and alternately (that is, these color filters having three colors), wherein, there is further a black matrix 203 between any two color filters. In addition, the second substrate 20 may further comprise a plurality of transparent conductive electrodes 202 electrically connected to each other and having the same electrode widths.

Along the color changing direction of the color filters of the resin layer, at the edge of at least one color filter, there is disposed one transparent conductive electrode 202, and any one transparent conductive electrode 202 may be disposed under any one color filter, that is, a side close to the liquid crystal molecules 403; moreover, the transparent conductive electrode 202 may be of the same potential as the second electrode 103.

On the basis of the above, specifically, as for any one color filter, the transparent conductive electrode 202 corresponding to the edge of the color filter may be located above the outside of the stripe-shape first electrode 102 corresponding to the color filter.

By arranging a plurality of conductive electrodes 202 on the second substrate 20, a vertical electrode field may be generated between the conductive electrode 202 corresponding to the edge of any one color filter and the first electrode 102 on the first substrate 10 under the color filter, and the vertical component may reduce the influence of the horizontal component of the electrical field generated by the first electrode 102 and the second electrode 103 on the rotation of the liquid crystal molecules in the liquid crystal layer 20 corresponding to the edges of two adjacent color filters close to each other.

Detailed Second Embodiment

The second embodiment of the present invention provides a liquid crystal display panel 01. Referring to FIG. 8, the liquid crystal display panel 01 may comprise a first substrate 10 and a second substrate 20 bonded to each other, and liquid crystal molecules 403 disposed between the first electrode 10 and the second substrate 20. The first substrate 10 may comprise a bottom-gate type thin film transistor 101, a plate-shape first electrode 102 electrically connected with the drain electrode of the thin film transistor 101, and a stripe-shape second electrode 103 disposed above the first electrode 102. The second substrate 20 may comprise a resin layer, and the resin layer may comprise a plurality of red color filters 201a, green color filters 201b and green color filters 201c arranged sequentially and alternately (that is, these color filters having three colors), wherein, there is further a black matrix 203 between any two color filters. In addition, the second substrate 20 may further comprise a plurality of transparent conductive electrodes 202 which are electrically connected to each other and have a same electrode width, and the transparent conductive electrode 202 may be of the same potential as the first electrode 102.

Along the color changing direction of the color filters of the resin layer, with respect to any two adjacent color filters, a part 202a of one transparent conductive electrode 202 may be disposed at a position where any two adjacent color filters oppose to each other, and the remaining portion of the transparent conductive electrode 202 except the part 202a may be further disposed under the black matrix 203 between the two adjacent color filters; moreover, the two adjacent color filters may be symmetric with respect to a center line of the corresponding one transparent conductive electrode 202.

On the basis of the above, in particular, with respect to any one color filter, the part 202a of the transparent conductive electrode 202 corresponding to the edge of the color filter may be located above the outside of the second electrode 103 corresponding to the color filter.

Here, by arranging a plurality of conductive electrodes 202 on the second substrate 20, a vertical electrode field may be generated between the part 202a of the conductive electrode 202 corresponding to the edge of any one color filter and the second electrode 103 on the first substrate 10 under the color filter, and the vertical component may reduce the influence of the horizontal component of the electrical field generated by the first electrode 102 and the second electrode 103 on the rotation of the liquid crystal molecules in the liquid crystal layer 20 corresponding to the edges of two adjacent color filters close to each other.

Here, those skilled in the art should understand that, since the liquid crystal panel is currently the main stream display panel in the display field, thus, the detailed first and second embodiments both give an explanation by taken the liquid crystal panel as an example, however, the embodiments of the present invention are not limited thereto. For example, the described display panel 01 may also be various display panels such as a plasma display panel, an electrophoresis display panel or the like.

Based on the above description, those skilled in the art should further understand that, all the figures in the embodiments of the present invention are brief diagram of the above described display panels, and only used to clearly describe the structure related with the inventive points in the present solution, and other structures having no relation with the inventive points are existing structures, and are not illustrated or partially illustrated in the figures.

The above description are only detailed embodiments of the present invention, but the protection scope of the present invention is not limited thereto, and those skilled in the art may easily conceive changes or substitutes in the technical scope disclosed by the present invention, which should be covered within the protection scope of the present invention. Thus, the protection scope of the present invention should be based on the protection scope of the claims.

The present application claims priority of Chinese Patent Application No. 201310631691.0, filed on Nov. 29, 2013, and the contents disclosed by the above Chinese Patent application are incorporated by reference in their entirety as a portion of the present application.

The invention claimed is:

1. A display panel, comprising a first substrate and a second substrate bonded to each other, and electro-optic material disposed between the first substrate and the second substrate,
   wherein the first substrate comprises a thin film transistor, a first electrode and a second electrode,
   the second substrate comprises a resin layer and a plurality of conductive electrodes, the resin layer comprises a plurality of color filters having different colors and arranged sequentially and alternately,
   wherein along a color changing direction of the color filters of the resin layer, at least a part of one conductive electrode is disposed at an edge of at least one color filter, and the conductive electrodes are disposed above or under the resin layer,
   wherein the conductive electrode is of a same potential with any one of the first electrode and the second electrode,
   wherein the first electrode and the second electrode are disposed at different layers, and the conductive electrode is of the same potential with one electrode of the first and second electrodes away from the conductive electrode,
   wherein a projection of the first electrode and a projection of the second electrode are at least partially overlapped, and
   wherein the first electrode and the second electrode are configured to form a horizontal electric field for driving the electro-optic material,
   wherein a black matrix is disposed between adjacent color filters, and the first electrode and the second electrode are not overlapped with the black matrix.

2. The display panel according to claim 1, wherein, an edge of each color filter is provided with one conductive electrode.

3. The display panel according to claim 1, wherein, along the color changing direction of the color filters of the resin layer, with respect to any two adjacent color filters, one conductive electrode is disposed at a position where the any two adjacent color filters oppose to each other;

wherein at the edge of any one color filter, a part of the one conductive electrode is provided.

4. The display panel according to claim 3, wherein, any two adjacent color filters are symmetric with respect to a center line of the corresponding one conductive electrode.

5. The display panel according to claim 1, wherein, along the color changing direction of the color filters of the resin layer, the plurality of conductive electrodes have an equal width.

6. The display panel according to claim 1, wherein, the plurality of conductive electrodes are all disposed at a side of the resin layer closer to the electro-optic material.

7. The display panel according to claim 6, wherein all the plurality of conductive electrodes are electrically connected to one another.

8. The display panel according to claim 1, wherein along a thickness direction of the display panel, a projection of the conductive electrode and a projection of the first electrode or the second electrode which is at a different potential from the conductive electrode, do not overlap.

9. The display panel according to claim 1, wherein, the conductive electrode is of the same potential with the second electrode, the first electrode is a strip-shape electrode, and the second electrode is a plate-shape electrode; or, the conductive electrode is of the same potential with the first electrode, the second electrode is a strip-shape electrode, and the first electrode is a plate-shape electrode.

10. The display panel according to claim 2, wherein, along the color changing direction of the color filters of the resin layer, the plurality of conductive electrodes have an equal width.

11. The display panel according to claim 3, wherein, along the color changing direction of the color filters of the resin layer, the plurality of conductive electrodes have an equal width.

12. The display panel according to claim 4, wherein, along the color changing direction of the color filters of the resin layer, the plurality of conductive electrodes have an equal width.

13. The display panel according to claim 2, wherein, the plurality of conductive electrodes are all disposed at a side of the resin layer closer to the electro-optic material.

14. The display panel according to claim 3, wherein, the plurality of conductive electrodes are all disposed at a side of the resin layer closer to the electro-optic material.

15. The display panel according to claim 4, wherein, the plurality of conductive electrodes are all disposed at a side of the resin layer closer to the electro-optic material.

16. A display panel, comprising a first substrate and a second substrate bonded to each other, and electro-optic material disposed between the first substrate and the second substrate, wherein the first substrate comprises, a first electrode and a second electrode configured to form a horizontal electric field for driving the electro-optic material, the second substrate comprises a resin layer and a plurality of conductive electrodes, the resin layer comprises a plurality of color filters having different colors and arranged sequentially and alternately, wherein at least one conductive electrode is disposed at a boarder between adjacent color filters of different colors, and wherein the conductive electrodes are configured to be applied with a same potential with any one of the first electrode and the second electrode, wherein the first electrode and the second electrode are disposed at different layers, and the conductive electrode is of the same potential with one electrode of the first and second electrodes away from the conductive electrode, and wherein a projection of the first electrode and a projection of the second electrode are at least partially overlapped, wherein a black matrix is disposed between adjacent color filters, and the first electrode and the second electrode are not overlapped with the black matrix.

17. The display panel according to claim 16, wherein the first electrode is at a side of the second electrode away from the first substrate, and the first electrode is a slit electrode.

18. The display panel according to claim 17, wherein the conductive electrodes are configured to be applied with a same potential with the second electrode.

19. The display panel according to claim 16, wherein the electro-optic material is liquid crystal.

20. The display panel according to claim 1, wherein one of the first electrode and the second electrode is a pixel electrode, the other of the first electrode and the second electrode is a common electrode, both the first electrode and the second electrode are disposed at a display region of each pixel.

* * * * *